United States Patent [19]

Weaver et al.

[11] Patent Number: 4,699,942
[45] Date of Patent: Oct. 13, 1987

[54] POLYESTER COMPOSITIONS

[75] Inventors: James C. Weaver; Wayne P. Pruett, both of Kingsport, Tenn.

[73] Assignee: Eastman Kodak Co., Rochester, N.Y.

[21] Appl. No.: 770,939

[22] Filed: Aug. 30, 1985

[51] Int. Cl.⁴ .............. C08K 13/02; C08K 5/01; C08K 3/34; C08L 67/02

[52] U.S. Cl. .................. 524/338; 524/100; 524/101; 524/222; 524/291; 524/304; 524/326; 524/333; 524/343; 524/350; 524/605; 524/451; 524/513

[58] Field of Search ............... 524/605, 338, 350, 304, 524/101, 291, 222, 343, 333, 326, 100

[56] References Cited

U.S. PATENT DOCUMENTS

| | | | |
|---|---|---|---|
| 3,769,260 | 10/1973 | Segal | 524/605 |
| 4,011,188 | 3/1977 | Rüter | 524/605 |
| 4,094,857 | 6/1978 | Wolfe | 524/605 |
| 4,207,230 | 6/1980 | Bier | 524/605 |
| 4,276,208 | 6/1981 | Ogawa | 524/605 |
| 4,330,462 | 5/1982 | Keck | 524/605 |

FOREIGN PATENT DOCUMENTS

| | | | |
|---|---|---|---|
| 55-50025 | 4/1980 | Japan | 524/605 |
| 56-109244 | 8/1981 | Japan | 524/605 |
| 58-53943 | 3/1983 | Japan | 524/605 |
| 59-124949 | 7/1984 | Japan | 524/605 |
| 7316078 | 5/1974 | Netherlands | 524/605 |

*Primary Examiner*—C. Warren Ivy
*Attorney, Agent, or Firm*—John F. Stevens; William P. Heath, Jr.

[57] ABSTRACT

Compositions suitable for molding are produced by examining a (1) polyethylene terephthalate polyester, (2) a low molecular weight polyethylene mold release agent (3) talc as nucleating agent, (4) carbon black, (5) a hindered phenolic antioxidant and (6) other optional ingredients such as reinforcing glass fibers.

9 Claims, No Drawings

POLYESTER COMPOSITIONS

DESCRIPTION

1. Technical Field

This invention relates to polyester compositions containing particular additives which render the compositions especially suitable for forming into shaped articles such as molded sheet material, particularly molded sheet material reinforced with fibrous material such as glass fibers.

2. Background of the Invention

It is known that many thermoplastic polymers can be formed into shaped objects by various sheet forming techniques such as deep drawing, stretch forming, stamping, forging, cold extrusion, etc. These forming processes are economically attractive because it is possible to achieve rapid production rates.

Generally in this art, a thermoplastic sheet, reinforced with a glass mat type of reinforcement is preheated in an oven to above the softening point of the resin. The heated blank is transferred to the matched metal dies of a stamping press, and stamped in a press or the like. The formed part is then removed from the matched dies. The forming process can be separated into the following distinct stages.

1. Preheating of sheet or blank.
2. Transfering to a stamping press.
3. Stamping under pressure for a predetermined time.
4. Removal or ejection from the press.

In stage 1, the composite sheet or blank is heated in a radiant, dielectric, infrared, convection, or vacuum oven or combination of ovens or similar heating source to a temperature above the melting point but below the decomposition point of the thermoplastic resin component of the blank.

In stage 2, the hot blank is transferred to a mold placed in a stamping press, wherein the mold or set of dies can impart the desired configuration of the final product to the sheet or blank. The mold is maintained at a temperature between room temperature (23° C.) and approximately 160° C. or more, depending on the polymer constituent of the sheet and upon the desired stamping characteristics.

In stage 3, the press is rapidly closed for a period of time sufficient to cause the blank to conform to the exact shape of the mold and to cool and/or crystallize sufficiently to allow part removal without distortion.

In stage 4, the molded article is removed from the mold.

It will be recognized that stamping parameters such as pressure requirements, residence time in the mold, preheat temperature, mold temperature, etc., are dependent upon the sheet compositions, thickness, part complexity, etc.

Polyesters such as polyethylene terephthalate, sometimes referred to herein as PET, are plastic materials which exist in a crystalline form and an amorphous form. Crystalline PET has physical properties which suggest that it would have great utility in the manufacture of structural panels, e.g., motor vehicle body panels, particularly if reinforced with a fibrous material. Thus, crystalline PET will resist deformation under loads at temperatures approaching its melting point (255° C.), which is much higher than most thermoplastic resins currently used for motor vehicle body panels, and sufficiently high to withstand the temperatures encountered in spray painting operations.

It has been found that to achieve acceptable forming cycles in the stampable sheets, a nucleating agent needs to be present so that the PET will crystallize in about 30 seconds at about 130°–210° C. Also, PET is a rather good adhesive and sticks to metal surfaces. To eliminate sticking of the stampable sheet during forming, an internal mold release agent should be present.

The PET should also contain carbon black as a colorant to give consistent jet black color and UV stability for outdoor applications, and a stabilizer to allow the final part to be used at elevated temperatures. It is generally preferred that the molded parts be of a particular color. Carbon black gives different levels of black according to particle size. Also, oxidation stabilizers should be used because oxidation causes breakdown in inherent viscosity (I.V.) causing loss of adhesion and brittleness of the polyester when the molded part is used at elevated temperatures.

It has now been discovered that a combination of particular nucleating agents, mold release agents, carbon blacks, and antioxidants should be used in order to achieve the best combination of properties for the polyester, and consequently for the molded articles made therefrom.

DESCRIPTION OF THE INVENTION

According to the present invention, a composition of matter is provided which comprises (A) a crystalline or amorphous polyester having repeating units from terephthalic acid and an aliphatic glycol having 2 to 8 carbon atoms, (B) a mold release agent consisting essentially of about 0.25–0.75% based on the weight of polyester of polyethylene having a molecular weight of about 500–2000, (C) a nucleating agent consisting essentially of about 0.25–0.75% based on the weight of the polyester of talc having a particle size of about 0.5–40 microns, (D) about 0.15–0.45% based on the weight of polyester of carbon black having a particle size of about 12–75 millimicrons, and (E) an antioxidant consisting essentially of about 0.5–2% based on the weight of polyester of a hindered phenol of the general formula

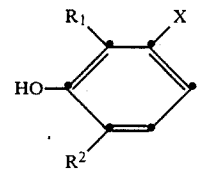

wherein $R_1$ is a branched alkyl group containing 3–20 carbon atoms, $R_2$ is H or a straight or branched alkyl group containing 1 to 20 carbon atoms, and X is an alkyl group or an electron donating group of a molecular weight which provides the hindered phenol with a volatility rate of less than 20% by weight after 6 hours at 230° C. at 1 atmosphere.

Further, the invention provides a concentrate having a polymer as a carrier, which contains scaled-up proportions of the additives B-E above which is suitable for mixing with a polyester to form the compositions described above. The invention also provides shaped articles such as sheet material comprising the composition described above which contain reinforcing glass fiber.

The polyester described in (A) above is preferably a polyester of terephthalic acid and ethylene glycol. However, the polyester in general may be derived from terephthalic acid and glycols containing 2-8 carbon atoms such as, for example, 1,4-butanediol, 1,4-cyclohexanedimethanol, etc., or mixtures of these glycols. Although the acid component is described as terephthalic acid, it may contain small amounts (e.g., up to about 10 mole %) of other acids such as isophthalic, naphthalene dicarboxylic, sebacic, glutaric, adipic, and the like. The polyester should have an inherent viscosity (I.V.) of at least 0.40, preferably about 0.45-1.0.

The mold release agent, polyethylene having a molecular weight (weight average) of about 500-2000, is commercially available. Suitable polyethylenes include Polywax polyethylenes such as Polywax 500, 655, 1000, and 2000 polyethylene, marketed by Petrolite Corporation. Polywax 1000 polyethylene (molecular weight of 1000) is preferred.

The nucleating agent, talc having a particle size of about 0.5-40 microns, is also commercially available. Suitable nucleating agents include Microtalc talc, marketed by Pfizer, Inc. Such talcs typically contain at least 90% silicon and magnesium oxide and minor amounts of calcium oxide, aluminum oxide, and ferric oxide. They are characterized by platy grain shape.

The carbon black having a particle size of about 12-75 millimicrons is commercially available. One suitable carbon black is Regal 660 marketed by Cabot Corporation.

The hindered phenol antioxidants are also commercially available. One suitable hindered phenol is Irganox 1010 antioxidant, marketed by Ciba-Geigy. Its chemical name is tetrakis[methylene 3-(3',5'-di-tert-butyl-4'-hyroxyphenyl)propionate]methane.

Other hindered phenols useful in the present invention include 1,3,5-tris(3,5-di-tert-butyl-4-hydroxybenzyl)-5-triazine-2,4,6-(1H, 3H, 5H)trione; 3,5-di-tert-butyl-4-hydroxyhydrocinnamic acid triester with 1,3,5-tris(2-hydroxyethyl)-S-triazine-2,4,6-(1H, 3H, 5H)-trione; octadecyl 3,5-di-tert-butyl-4-hydroxyhydrocinnamate; thiodiethylene bis(3,5-di-tert-butyl-4-hydroxy) hydrocinnamate; N,N'-hexamethylene bis(3,5-di-tert-butyl-4-hydroxy-hydrocinnamamide); 1,6-hexamethylene bis(3,5-di-tert-butyl-4-hydroxyhydrocinnamate); 1,3,5-trimethyl-2,4,6,-tris(3,5-di-tert-butyl-4-hydroxybenzyl)benzene; 2,4-bis(n-octylthio)-6-(4 hydroxy-3,5-di-tert-butylanilino)-1,3,5-triazine; n-octadecyl 3,5-di-terbutyl-4-hydroxyphenylacetate; 1,3,5-tris(4-tert-butyl-3-hydroxy-2,6-dimethylbenzyl)-1,3,5-triazine-2,4,6-(1H, 3H, 5H)trione; 2,2'-methylenebis(4-ethyl-6-tert-butylphenol); 2,2'-methylenebis(4-methyl-6-tert-butylphenol); 4,4'-methylenebis(2,6-di-tert-butyl-phenol); 4,4'-thiobis(6-tert-butyl-o-cresol); 3:1 condensate of 3-methyl-6-tert-butylphenol and crotonaldehyde; 4,4'-butyldienebis(6-tert-butyl-m-cresol)3,5-di-tert-butyl-4-hydroxybenzyl ether; 2,2'-oxamidobis ethyl3(3,5-di-tert-butyl-4-hydroxyphenyl)propionate; stearyl β-(3,5-di-tert-butyl-4-hydroxyphenyl) propionate; distearyl 3-methyl-4-hydroxy-5-tert-butylbenzyl malonate; 4,4'propyl-methylenebis(2-tert-butyl-5-methylphenol); 2,2'-propylmethylenebis(4,6-dimethylphenol); 2,2'-methylenebis(4,6'-di-tert-butylphenol); 1,4-bis(3',5'-di-tert-butyl-4'-hydroxybenzyl)-2,3,5,6-tetramethylbenzene; 1,1-bis(3'-cyclohexyl-4'-hydroxyphenyl)-cyclohexane; 2,6-bis(2'-hydroxy-3'-tert-butyl-5'-methylphenyl)-4-methylphenol; 2,4,6-tris((β-(3',5'-di-butyl-4'-hydroxyphenyl)ethyl)-1,3,5-triazine; 2,4,6-tris(3',5'-di-tert-butyl-4'-hydroxybenzyl)-phenol.

The polyester composition may be produced by blending the additives B-E individually or in combination into the polyester in a conventional manner, such as by melt blending. It is preferred, however, to produce a polymer concentrate using the polymer as a carrier, in which the additives are blended in concentrated amounts. Various polymers can be used so long as processing and physical properties of the final polyester compositions are not affected. A preferred concentrate is described as follows:

(A) a polyester having repeating units from terephthalic acid and an aliphatic glycol having 2 to 8 carbon atoms, (B) a mold release agent consisting essentially of about 2.5-7.5% based on the weight of polyester of polyethylene having a molecular weight of about 500-2000, (C) a nucleating agent consisting essentially of about 2.5-7.5% based on the weight of the polyester of talc having a particle size of about 0.05-40 microns, (D) about 1.5-4.5% based on the weight of the polyester of carbon black having a particle size of about 12-75 millimicrons, and (E) an antioxidant consisting essentially of about 5-20% based on the weight of polyester of a hindered phenol of the general formula

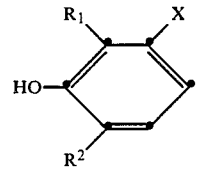

wherein $R_1$ is a branched alkyl group containing 3-20 carbon atoms, $R_2$ is H or a straight or branched alkyl group containing 1 to 20 carbon atoms, and X is an alkyl group or an electron donating group of a molecular weight which provides said hindered phenol with a volatility rate of less than 20% by weight after 6 hours at 230° C., The polyester composition according to this invention is especially useful when reinforced. The preferred reinforcing material is glass fiber. The fiber may be in the form of staple fibers having a length of at least 1 cm, usually from 1 to 5 cm, or, more desirably, in the form of continuous fibers. Preferably the fibrous material is introduced into the sheet in the form of a mat composed of layers of fiber held together by needling or by a binder compatible with PET to form a loose cohesive web. The fibrous material will usually be present in amounts of from 10 to 50 by weight, preferably from 30 to 45 by weight, based on the weight of polyester.

In the production of the sheet material, layers of polyester and fiber may be superimposed and heated, compressed and cooled between two platens, the temperature of which can be controlled. Since the production of accurate and rapid temperature changes in such platens is difficult, the layers are preferably superimposed by feeding a layer of polyester and a mat of fibrous reinforcing material into a nip formed between two movable members which advance the superimposed layers through a heating and/or cooling zones in which the temperature of the layers can be controlled.

The layer of polyester may be fed into the nip in the form of a sheet of solid polyester. In this arrangement the superimposed layers would initially be advanced through a heating zone in which the polyester is melted and then through a cooling zone. Alternatively the layer of polyester may be fed into the nip in molten form directly from an extrusion device.

The nip may be formed by a plurality of pairs of heat conductive rolls, the temperature of which can be controlled so that if necessary the superimposed layers are heated between a first set of rolls to a temperature sufficient to melt the polyester, and then rapidly cooled between a second set of rolls. A release agent is preferably applied to the rolls to facilitate removal of the layers therefrom as they pass along the nip.

Suitable equipment incorporating such rolls or belts is readily available and will be familiar to those skilled in the art.

In order to ensure that the reinforcing material does not accumulate undesirably close to the surface of the sheet material, the layers of polyester and reinforcing material are preferably arranged so that a layer of reinforcing material is sandwiched between two layers of polyester. If desired, a plurality of layer of reinforcing material may be incorporated in the sheet. In such a case, each layer of reinforcing material is preferably sandwiched between two layers of polyester.

The sheet material containing polyester may be formed into an article of any desired shape using conventional molding equipment.

The polyester compositions may also be used in conjunction with glass fiber in a manner described in detail in U.S. Pat. No. 4,277,531, incorporated herein by reference.

The following examples are submitted for a better understanding of the invention.

EXAMPLE 1

(Control)

Poly(ethylene terephthalate) is a crystallizable polyester and is useful as a base resin for reinforcement because of the high heat deflection temperature of the reinforced plastic. Upon reinforcement, the heat deflection temperature approaches the crystalline melting point (~255° C.) of the polyester. However, to make the reinforced plastic commercially attractive, it is desirable to add a nucleating additive to the polyester to permit the product to be molded or formed in an acceptably short cycle time and at an acceptably low mold temperature. Because thermoplastic polyesters are susceptible to thermal and hydrolytic degradation during melt processing, it is critical that any additive introduced to the system not contribute unduly to the degradation of the polyester. Degradation of the polyester, which leads to a loss in mechanical properties, is monitored by measuring inherent viscosity of the polyester. This example illustrates the process by which a nucleating agent is used for PET and further illustrates that additives which may offer an improvement in crystallization may also degrade the polyester.

PET (I.V. 0.72) in a fine powder form is thoroughly dry mixed with the additive. The mixture is dried for about four hours at about 120° C., and extrusion compounded at about 270° C., granulated to a fine powder, redried and analyzed by differential scanning calorimetry (DSC). DSC data is obtained as follows:

1. Heated at 20° C./minute to 300° C. to melt polymer.
2. Cooled to obtain crystallization from the melt ($T_{CC}$—temperature of crystallization upon cooling from the melt—$T_{CC}$ desirably is as close to $T_M$ as possible to indicate fast crystallization rate).
3. Heated at 320° C./minute to 300° C. to destroy crystallization.
4. Held for 1 minute, quenched, heated at 20° C./minute to obtain glass transition temperature ($T_G$), crystallization from the glass ($T_{CH}$), and melting point ($T_M$). $T_{CH}$ is the temperature of crystallization upon heating from the glassy state and is desirably as close to $T_G$ as possible.

| ADDITIVE | $T_G$, °C. | $T_{CH}$, °C. | $T_{CC}$, °C. | $T_M$, °C. | I.V. |
|---|---|---|---|---|---|
| None | 75.2 | 151.8 | 177.4 | 247.8 | 0.66 |
| 0.5% Sodium stearate | 71.9 | 124.0 | 203.8 | 250.8 | 0.58 |
| 0.5% Zinc stearate | 81.0 | 133.3 | 185.4 | 250.8 | 0.57 |

The DSC analyses show that unmodified PET crystallizes upon heating at a relatively high temperature of 151.8° C. and upon cooling at 177.4° C. However, upon the addition of 0.5% sodium stearate, crystallization occurs at a much lower temperature upon heating (124° C.) and much higher temperature upon cooling (203.8° C.). Zinc stearate, which is known to be a good mold release agent and is readily available commercially in the form of aerosol sprays or powder, also increases the crystallizability of PET. Both additives decrease the thermal stability of the polyester and lower the I.V. by about 12–14%. While both sodium and zinc stearates act as good nucleating agents for PET, the decrease in I.V. which occurs makes their use detrimental to the PET.

EXAMPLE 2

(Control)

Thermoplastic polyesters are rather good adhesives and often stick to metal surfaces. It is necessary that compositions based on poly(ethylene terephthalate) contain internal mold release agents to eliminate the possibility of the part being molded or formed from adhering to the mold surface, thereby interrupting or lengthening the molding cycle. It is desirable that the mold release agent be incorporated internally in the polymer composition rather than being sprayed onto or otherwise added topically to the mold surface to make the molding cycle automatic and to avoid post finishing problems such as poor paint adhesion.

This example illustrates that zinc stearate performs somewhat as a nucleating agent. Since additives often perform synergistically, PET powder is mixed with 0.5% wt% each of sodium stearate nucleating agent and zinc stearate mold release agent and analyzed by DSC.

| ADDITIVE | $T_G$, °C. | $T_{CH}$, °C. | $T_{CC}$, °C. | $T_M$, °C. | I.V. |
|---|---|---|---|---|---|
| None | 77.4 | 145.5 | 173.8 | 249.5 | 0.65 |
| 0.5% Sodium stearate + 0.5% Zinc stearate | 76.4 | 122.0 | 206.8 | 252.5 | 0.54 |

The results show that the combination of additives does not significantly increase the crystallizability over that of PET containing only sodium stearate but the large increase in thermal degradation which occurs as indicated in the decrease in I.V., makes their use detrimental in polyesters.

EXAMPLE 3

Inorganic additives are more useful as nucleating agents in PET than organic salts such as the stearates because they cause less thermal degradation. However, they are less efficient than the salts. Example 3 illustrates the discovery that talc is unique in that it is more efficient than other inorganic additives in promoting crystallization of PET. Further, it was discovered that Polywax 1000 polyethylene (M.W.=1000) serves as a mold release agent for PET and in combination with talc, unlike zinc stearate, causes no thermal degradation of the polyester.

| ADDITIVE | $T_G$, °C. | $T_{CH}$, °C. | $T_{CC}$, °C. | $T_M$, °C. | I.V. |
|---|---|---|---|---|---|
| None (Control) | 77.5 | 143.3 | 176.2 | 251.3 | 0.69 |
| 0.5% Calcium carbonate (Control) | 76.9 | 144.8 | 180.4 | 247.8 | 0.66 |
| 0.5% Titanium dioxide (Control) | 70.0 | 140.0 | 185.0 | 249.0 | 0.65 |
| 0.5% Talc | 72.0 | 135.0 | 200.0 | 249.0 | 0.65 |
| 0.5% Talc + 0.5% Zinc stearate (Control) | 74.5 | 125.9 | 210.3 | 253.0 | 0.58 |
| 0.5% Talc + 0.5% Polywax 1000 polyethylene | 75.9 | 125.3 | 211.0 | 252.3 | 0.69 |

EXAMPLE 4

The combination of 0.5% talc and 0.5% Polywax 1000 polyethylene is useful for producing crystalline parts from injection-molded glass fiber reinforced PET without causing thermal degradation. Parts release automatically from the mold on a short molding cycle, and also release easily when the sheet is removed from a molding press. Even after undergoing multiple melt processing steps, the I.V. of the part remains high.

PET is dry mixed with 30 wt % ⅛ in. chopped strand glass fiber, 0.5 wt % Talcron CP 38-33 talc and 0.5 wt % Polywax 1000 polyethylene. The mixture is dried at 120° C., extrusion compounded on a twin-screw extruder at 270° C., redried at 170° C. to dry and crystallize the pellets, and injection molded at 270° C. A mold heated to 140° C. and an overall cycle of 40 seconds is used. The crystalline parts are characterized by high heat deflection temperature (HDT).

| COMPOSITION | MOLDABILITY | DENSITY | I.V. | HDT, 66 psi, °C. |
|---|---|---|---|---|
| PET + 30 wt % ⅛" glass fiber (Control) | Required long cycle, runner stuck. | 1.597 | 0.53 | 237 |
| Above + 0.5% sodium stearate + 0.5% zinc stearate (Control) | Released automatically | 1.576 | 0.45 | 252 |
| Above + 0.5% Talcron CP38-33 talc + 0.5% Polywax 1000 polyethylene | Released automatically, smooth, glossy, white parts | 1.599 | 0.53 | 235 |

EXAMPLE 5

Due to the good thermal stability of PET containing the unique combination of talc and polyethylene, the system is useful in a number of applications. For example, the additives may be compounded into a concentrate to be diluted in a later melt operation such as in the production of PET film, sheet, or reinforced sheet.

Extrusion grade polypropylene stabilized with 0.10% Irganox 1010 and 0.25% DLTDP (dilauryl thiodipropionate, which is commercially available) is melt compounded in a Banbury mixer with 10% Talcron CP38-33 talc, 10% Polywax 1000 polyethylene, and 6% Regal 660 carbon black. PET and 5 wt % of the above concentrate are dry mixed, dried at 150° C. for 6 hours, and extruded into film at 275° C. The film is tough and possesses a high I.V.

| COMPOSITION | I.V. | TEAR STRENGTH, 16/in. |
|---|---|---|
| PET Control, 20 mil film | 0.68 | 680 |
| PET + 5% "Concentrate" described above, 20 mil film | 0.66 | 647 |

PET is dry mixed with 3.33% of a concentrate which contains 60.90% polypropylene (carrier), 0.10% Irganox 1010 antioxidant, 15.00% Talcron CP38-33 talc, 15.00% Polywax 1000 polyethylene, and 9.00% Regal 660 carbon black and dried six hours at 150° C. The dried mixture is extruded between two Owens-Corning M8608, 2 oz./ft² continuous strand glass mats, and laminated on either side with a 5 mil "cap" film which had been previously extruded from PET and 3.33% of the concentrate just described. By exerting sufficient compression to the five-layer structure, a glass mat reinforced PET sheet is produced which contains about 38 wt % reinforcement and possesses a high I.V. of 0.59.

The reinforced PET sheet is heated in an infrared oven to a surface temperature of about 275° C., transferred to a mold preheated to about 155° C., formed and crystallized under pressure of about 1200 psi for about 30 seconds. The formed, crystalline part releases automatically from the mold, possesses a smooth, hard surface, retains a high I.V. after multiple melt processing steps, and is characterized by high strength and heat deflection temperature.

| REINFORCED PET SHEET COMPOSITION | PET |
|---|---|
| | 37% Glass Fiber Reinforcement |
| | 0.5% Talcron CP 38-33 talc |
| | 0.5% Polywax 1000 polyethylene |
| | 0.3% Regal 660 Carbon Black |
| I.V. | 0.57 |
| Density. G/CC | 1.626 |
| Notched Izod Impact Strength | 12 ft-lb/in. |

| REINFORCED PET SHEET COMPOSITION | PET |
|---|---|
| Unnotched Izod Impact Strength | 11 ft-lb/in |
| Falling Weight Plague Impact | 9 ft-lb |
| Heat Deflection Temperature, 66 psi | 251° C. |

EXAMPLE 6

Due to the hard, crystalline nature of these reinforced PET compositions and the high heat deflection temperature which they possess, parts molded or formed from such compositions may be useful in automotive applications which are exposed to elevated temperatures over extended time periods. If not properly stabilized, polyester based compositions may undergo thermo-oxidative degradation under such conditions. As indicated by a decrease in inherent viscosity, chain scission may occur which will result in a decrease in mechanical properties, notably strength properties.

The functional life of a glass reinforced PET part at elevated temperatures is extended by the addition of about 0.5–1.0 wt % Irganox 1010 stabilizer as illustrated below.

PET 3.33% of a concentrate based in polypropylene and containing 15% Microtalc MP25-38 talc, 15% Polywax 1000 polyethylene, and 9% Regal 660 carbon black is dry blended with Irganox 1010 antioxidant, extruded at 275° C., and injecton molded at 275° C. into test specimens. The specimens are aged in a 150° C. forced air oven for extended time periods. Degradation is noted by measuring changes in I.V. and strength properties.

| PET + 0.5% Microtalc MP25-38 talc + 0.5% Polywax 1000 polyethylene + 0.3% Regal 660 Carbon Black + Following | UNAGED | | | AGED 1000 HRS AT 150° C. | | |
|---|---|---|---|---|---|---|
| | UTS PSI × 10³ | FWI, FT-LB/IN² | I.V. | UTS PSI × 10³ | FWI, FT-LB/in² | I.V. |
| Control | 11.16 | 2.87 | 0.58 | 5.66 | 0.45 | 0.39 |
| 0.5% Irganox 1010 | 11.33 | 2.65 | 0.60 | 6.78 | 0.97 | 0.44 |
| 1.0% Irganox. 1010 | 11.49 | 2.76 | 0.60 | 8.62 | 1.13 | 0.49 |
| 2.0% Naugard 445 | 11.82 | 2.29 | 0.58 | 6.46 | 0.61 | 0.45 |

UTS = Ultimate Tensile Strength
FWI = Flatwise Impact Strength

In the examples, the Microtalc MP26-38 has a particle size of about 20 microns. The Regal 660 has a particle size of about 24 millimicrons.

Polywax 1000 polyethylene has a molecular weight of 1000.

The physical properties used herein are measured as follows:

| Property | ASTM |
|---|---|
| Notched Izod Impact Strength | D256 |
| Unnotched Izod Impact Strength | D256 |
| Falling Weight Plague Impact | D3029 |
| Heat Deflection Temperature | D648 |
| Ulrimate Tensile Strength | D638 |
| Flatwise Impact Strength | MODIFIED D256 |
| Tear Strength | D1922 |

Unless otherwise specified, all parts, percentages, ratios, etc., are by weight.

The invention has been described in detail with particular reference to preferred embodiments thereof, but it will be understood that variations and modifications can be effected within the spirit and scope of the invention.

As used herein, the inherent viscosity (I.V.) is measured at 25° C. using 0.50 gram of polymer per 100 ml of a solvent consisting of 60 percent by weight phenol and 40 percent by weight tetrachloroethane.

We claim:
1. Composition of matter comprising
   (A) a polyester having repeating units from terephthalic acid and an aliphatic glycol having 2 to 8 carbon atoms,
   (B) a mold release agent consisting essentially of about 0.25–0.75% based on the weight of polyester of polyethylene having a weight average molecular weight of about 5000–2000,
   (C) a nucleating agent consisting essentially of about 0.25–0.75% base on the weight of the polyester of talc having a particle size of about 0.5–40 microns,
   (D) about 0.15–0.45% based on the weight of polymer of carbon black having a particle size of about 12–75 millimicrons, and
   (E) an antioxidant consisting essentially of about 0.5–2% based on the weight of polyester of a hindered phenol of the general formula

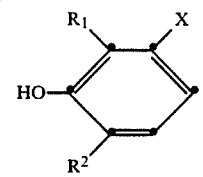

wherein $R_1$ is a branched alkyl group containing 3–20 carbon atoms, $R_2$ is H or a straight or branched alkyl group containing 1 to 20 carbon atoms, and X is an alkyl group or an electron donating group of a molecular weight which provides said hindered phenol with a volatility rate of less than 20% by weight after 6 hours at 230° C. at 1 atmosphere.

2. Composition according to claim 1 wherein said glycol is ethylene glycol.

3. Composition according to claim 1 wherein said glycol is 1,4-butanediol.

4. Composition according to claim 1 wherein said glycol is 1,4-cyclohexanedimethanol.

5. Composition according to claim 1 wherein said hindered phenol is tetrakis[methylene 3-(3',5'-di-tert-butyl-4'-hydroxyphenyl)propionate]methane.

6. A concentrate comprising
   (A) a polyester having repeating units from terephthalic acid and an aliphatic glycol having 2 to 8 carbon atoms, (B) a mold release agent consisting essentially of about 2.5–10% based on the weight of polyester of polyethylene having a weight average molecular weight of about 500–2000, (C) a nucleating agent consisting essentially of about 2.5–10% based on the weight of the polyester of talc having a particle size of about 0.05–40 microns, (D) about 1.5–6.0% based on the weight of the polyester of carbon black having a particle size of about 12–75 millimicrons, and (E) an antioxidant consisting essentially of about 5–20% based on the weight of polyester of a hindered phenol of the general formula

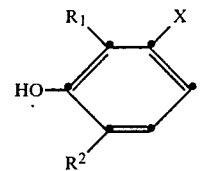

wherein $R_1$ is a branched alkyl group containing 3–20 carbon atoms, $R_2$ is H or a straight or branched alkyl group containing 1 to 20 carbon atoms, and X is an alkyl group or an electron donating group of a molecular weight which provides said hindered phenol with a volatility rate of less than 20% by weight after 6 hours at 230° C. at 1 atmosphere.

7. A shaped article comprising the composition according to claim 1 and about 10 to about 50% by weight based on the weight of said composition of reinforcing glass fiber distributed throughout said composition.

8. Sheet material comprising the composition of claim 1.

9. Sheet material comprising the composition according to claim 1 and about 10 to about 50% by weight based on the weight of said composition of reinforcing glass fiber distributed throughout said composition.

* * * * *